United States Patent
Beers et al.

(10) Patent No.: US 10,472,072 B2
(45) Date of Patent: Nov. 12, 2019

(54) SUPPLY TUBE FOR SENSOR

(71) Applicant: HAMILTON SUNDSTRAND CORPORATION, Windsor Locks, CT (US)

(72) Inventors: Craig M. Beers, Wethersfield, CT (US); Christopher McAuliffe, Windsor, CT (US); Harold W. Hipsky, Willington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 315 days.

(21) Appl. No.: 14/951,818

(22) Filed: Nov. 25, 2015

(65) Prior Publication Data

US 2017/0144769 A1    May 25, 2017

(51) Int. Cl.
   *B64D 13/08*    (2006.01)
   *G01P 5/165*    (2006.01)
   (Continued)

(52) U.S. Cl.
   CPC ............ *B64D 13/08* (2013.01); *B64D 13/02* (2013.01); *F04D 25/0666* (2013.01);
   (Continued)

(58) Field of Classification Search
   CPC ............ B64D 13/08; B64D 2013/0651; B64D 13/02; B64D 47/00; F01N 2560/08;
   (Continued)

(56) References Cited

U.S. PATENT DOCUMENTS

| 314,323 A | * | 3/1885 | Flad | G01F 1/372 |
| | | | | 73/861.51 |
| 481,310 A | * | 8/1892 | Robinson | G01F 1/46 |
| | | | | 73/861.65 |

(Continued)

FOREIGN PATENT DOCUMENTS

| EP | 2377759 A1 | 10/2011 |
| GB | 1038139 A | 8/1966 |

OTHER PUBLICATIONS

EP SR, dated Apr. 25, 2017, U310709EP, EP Patent Application No. EP16200348, 8 pages.

*Primary Examiner* — Cassey D Bauer
*Assistant Examiner* — Miguel A Diaz
(74) *Attorney, Agent, or Firm* — Cantor Colburn LLP

(57) ABSTRACT

A sensor supply tube assembly is provided for disposition within a compressor outlet through which a main flowpath is defined and a sensor port transversely coupled to the compressor outlet. The sensor supply tube assembly includes first and second tubes. The first tube is formed to direct main flowpath fluid from the compressor outlet and through a portion of the sensor port and includes first and second ends disposed within the sensor port and the compressor outlet, respectively, and a curved section interposed between the first and second ends. The second tube includes a sleeve tightly fittable between the first end and the sensor port and a base. The base has an exterior surface from which the sleeve extends and which is disposed and configured to non-rotatably abut with an interior surface of the compressor outlet.

18 Claims, 7 Drawing Sheets

(51) Int. Cl.
*G01F 1/46* (2006.01)
*F25B 31/00* (2006.01)
*F25B 49/02* (2006.01)
*G01P 5/16* (2006.01)
*F04D 25/06* (2006.01)
*B64D 13/02* (2006.01)
*F01N 13/00* (2010.01)
*B64D 13/06* (2006.01)
*F16L 41/00* (2006.01)
*F16L 41/08* (2006.01)

(52) U.S. Cl.
CPC ............ *F25B 31/00* (2013.01); *F25B 49/022* (2013.01); *G01F 1/46* (2013.01); *G01P 5/16* (2013.01); *G01P 5/165* (2013.01); *B64D 2013/0651* (2013.01); *F01N 13/008* (2013.01); *F01N 2560/08* (2013.01); *F16L 41/004* (2013.01); *F16L 41/008* (2013.01); *F16L 41/08* (2013.01); *F25B 2700/193* (2013.01)

(58) Field of Classification Search
CPC .... F01N 13/008; F04D 9/048; F04D 25/0666; F15B 13/086; F25B 2700/1933; F25B 2700/193; F25B 2700/1931; F25B 31/00; F25B 49/022; B05B 12/006; B01L 2200/146; G01F 1/46; G01P 5/16; G01P 5/165
USPC .......................... 73/862.65, 862.67; 62/228.1
See application file for complete search history.

(56) References Cited

U.S. PATENT DOCUMENTS

| | | | | |
|---|---|---|---|---|
| 817,470 A * | 4/1906 | Cole et al. | G01F 1/46 | |
| | | | | 137/590 |
| 886,255 A * | 4/1908 | Sargent | G01F 1/46 | |
| | | | | 73/861.65 |
| 2,768,135 A * | 10/1956 | Adelson | G01N 27/26 | |
| | | | | 204/400 |
| 3,581,565 A * | 6/1971 | Dieterich | G01P 5/16 | |
| | | | | 73/861.66 |
| 3,691,834 A * | 9/1972 | De Fasselle | G01F 1/22 | |
| | | | | 73/861.54 |
| 3,803,921 A * | 4/1974 | Dieterich | G01N 1/2035 | |
| | | | | 73/203 |
| 3,876,009 A * | 4/1975 | Johnson, Jr. | A62C 35/605 | |
| | | | | 169/13 |
| 3,937,082 A * | 2/1976 | Schilling | G01P 5/14 | |
| | | | | 73/861.54 |
| 4,462,204 A | 7/1984 | Hull | | |
| 4,482,365 A | 11/1984 | Roach | | |
| 4,498,347 A * | 2/1985 | Grantham | G01F 1/46 | |
| | | | | 73/861.66 |
| 4,551,069 A * | 11/1985 | Gilmore | F04C 14/06 | |
| | | | | 417/13 |
| 4,793,188 A * | 12/1988 | Strasser | G01L 9/0089 | |
| | | | | 200/82 E |
| 4,920,740 A * | 5/1990 | Shekleton | F23R 3/28 | |
| | | | | 60/739 |
| 4,957,249 A * | 9/1990 | Aulehla | B64C 15/02 | |
| | | | | 239/265.19 |
| 5,123,240 A | 6/1992 | Frost | | |
| 5,131,807 A * | 7/1992 | Fischer | F01D 25/22 | |
| | | | | 415/111 |
| 5,209,258 A * | 5/1993 | Sharp | G01F 1/36 | |
| | | | | 137/343 |
| 5,273,407 A * | 12/1993 | Jarchau | B01F 15/0201 | |
| | | | | 138/45 |
| 5,567,121 A * | 10/1996 | Peterson | F04B 39/10 | |
| | | | | 137/557 |
| 5,859,589 A * | 1/1999 | McGrew, Jr. | G01F 23/585 | |
| | | | | 340/614 |
| 5,945,606 A * | 8/1999 | Tokunaga | B60C 23/04 | |
| | | | | 374/E1.018 |
| 6,105,380 A * | 8/2000 | Yokomachi | F04B 27/1804 | |
| | | | | 62/114 |
| 6,359,377 B1 * | 3/2002 | Durling | G01L 23/22 | |
| | | | | 313/118 |
| 6,609,733 B2 * | 8/2003 | Gilmore | B01F 5/0451 | |
| | | | | 138/40 |
| 6,813,942 B1 * | 11/2004 | Vozhdaev | G01P 13/025 | |
| | | | | 73/170.02 |
| 6,926,490 B2 * | 8/2005 | McAuliffe | B64D 13/06 | |
| | | | | 415/1 |
| 7,278,320 B1 * | 10/2007 | Clifton | G01F 1/44 | |
| | | | | 73/736 |
| 7,328,623 B2 * | 2/2008 | Slagle | G01K 13/02 | |
| | | | | 374/E13.006 |
| 7,335,164 B2 * | 2/2008 | Mace | A61B 5/083 | |
| | | | | 422/84 |
| 8,863,548 B2 * | 10/2014 | Hipsky | B64D 13/06 | |
| | | | | 62/401 |
| 9,243,643 B2 * | 1/2016 | Beers | F04D 25/082 | |
| 2001/0023613 A1 * | 9/2001 | Lemberger | B60C 23/0496 | |
| | | | | 73/146.8 |
| 2001/0031203 A1 * | 10/2001 | Schroeder | F04B 39/10 | |
| | | | | 417/63 |
| 2006/0207344 A1 * | 9/2006 | Welker | G01F 1/46 | |
| | | | | 73/861.65 |
| 2007/0023083 A1 * | 2/2007 | Huang | F16K 15/026 | |
| | | | | 137/226 |
| 2008/0250884 A1 * | 10/2008 | Braun | G01P 5/165 | |
| | | | | 73/866.5 |
| 2009/0145101 A1 * | 6/2009 | Suciu | F01D 5/022 | |
| | | | | 60/39.092 |
| 2010/0071693 A1 * | 3/2010 | Allum | A61M 16/04 | |
| | | | | 128/203.27 |
| 2012/0011878 A1 * | 1/2012 | Hipsky | B64D 13/06 | |
| | | | | 62/401 |
| 2012/0014784 A1 * | 1/2012 | Hipsky | B64D 13/00 | |
| | | | | 415/177 |
| 2014/0020479 A1 * | 1/2014 | Barbou | G01P 5/16 | |
| | | | | 73/861.65 |
| 2014/0030070 A1 * | 1/2014 | Beers | F04D 25/082 | |
| | | | | 415/170.1 |
| 2014/0053644 A1 * | 2/2014 | Anderson | G01P 5/165 | |
| | | | | 73/180 |
| 2014/0117103 A1 * | 5/2014 | Rossi | G05D 23/27537 | |
| | | | | 236/99 R |
| 2014/0202121 A1 * | 7/2014 | Beers | F02C 7/05 | |
| | | | | 55/306 |
| 2015/0219516 A1 * | 8/2015 | Grice | G01L 19/083 | |
| | | | | 701/33.9 |
| 2016/0003509 A1 * | 1/2016 | Pistone | G01K 13/00 | |
| | | | | 29/890.031 |
| 2017/0029126 A1 * | 2/2017 | Sarno | B64D 15/06 | |
| 2017/0074695 A1 * | 3/2017 | Baecke | G01L 13/00 | |
| 2017/0144769 A1 * | 5/2017 | Beers | B64D 13/08 | |
| 2017/0307428 A1 * | 10/2017 | Malladi | G01F 25/0007 | |

* cited by examiner

SUPPLY TUBE FOR SENSOR

BACKGROUND OF THE DISCLOSURE

The subject matter disclosed herein relates to sensor supply tubes and, more particularly, to debris resistant supply tubes for pressure sensing devices.

Environmental control systems (ECS) are utilized on various types of aircraft for several purposes, such as in cooling systems for the aircraft. Components of the ECS may be utilized to remove heat from various aircraft lubrication and electrical systems and/or may be used to condition aircraft cabin air. The cabin air conditioner includes one or more cabin air compressors (CACs) which compress air entering the system, from an outside source or from a ram air system. The compressed air is delivered to an environmental control system to bring it to a desired temperature then delivered to the aircraft cabin. After passing through the cabin, the air is typically exhausted to the outside. The CACs are typically driven by air-cooled electric motors, which are cooled by a flow of cooling air typically drawn by the ram air system.

Performance characteristics of the CAC are related to, among other factors, pressures within an outlet of the CAC. As such, a pressure sensor is typically mounted within a sensor port at the CAC outlet in order to measure fluid pressures therein. The accuracy of this pressure sensor may be negatively affected by debris flowing through the CAC outlet.

BRIEF DESCRIPTION OF THE DISCLOSURE

According to one aspect of the disclosure, a sensor supply tube assembly is provided for disposition within a compressor outlet through which a main flowpath is defined and a sensor port transversely coupled to the compressor outlet. The sensor supply tube assembly includes first and second tubes. The first tube is formed to direct main flowpath fluid from the compressor outlet and through a portion of the sensor port and includes first and second ends disposed within the sensor port and the compressor outlet, respectively, and a curved section interposed between the first and second ends. The second tube includes a sleeve tightly fittable between the first end and the sensor port and a base. The base has an exterior surface from which the sleeve extends and which is disposed and configured to non-rotatably abut with an interior surface of the compressor outlet.

According to another aspect of the disclosure, a cabin air compressor (CAC) is provided and includes a compressor outlet through which a main flowpath is defined, a sensor port transversely coupled to the compressor outlet, a sensor coupled to the sensor port and first and second tubes. The first tube is formed to direct main flowpath fluid from the compressor outlet and through a portion of the sensor port to the sensor and includes first and second ends disposed within the sensor port and the compressor outlet, respectively, and a curved section interposed between the first and second ends. The second tube includes a sleeve tightly fittable between the first end and the sensor port and a base. The base has an exterior surface from which the sleeve extends and which is disposed and configured to non-rotatably abut with an interior surface of the compressor outlet.

According to yet another aspect of the disclosure, a cabin air compressor (CAC) is provided and includes a compressor outlet through which a main flowpath is defined, a sensor port transversely coupled to the compressor outlet, a pressure sensor coupled to the sensor port and a sensor supply tube assembly non-rotatably disposable in the compressor outlet and the sensor port to direct main flowpath fluid from the compressor outlet and through a portion of the sensor port to the pressure sensor along first and second transverse flowpaths and along a curved flowpath interposed between the first and second flowpaths.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a sensor supply tube assembly is provided with a reverse facing opening on a downstream side of a J-shaped tube. This J-shaped tube thus filters air flowing to the pressure sensor as debris, dirt, etc. is transported downstream with a main airflow and cannot easily flow in a reverse direction into the pressure sensing port due to particle momentum in the flow field. The reduced particulate concentration in the pressure sensing port provides for a more consistent and reliable method of measuring CAC outlet pressures.

Figure 1:
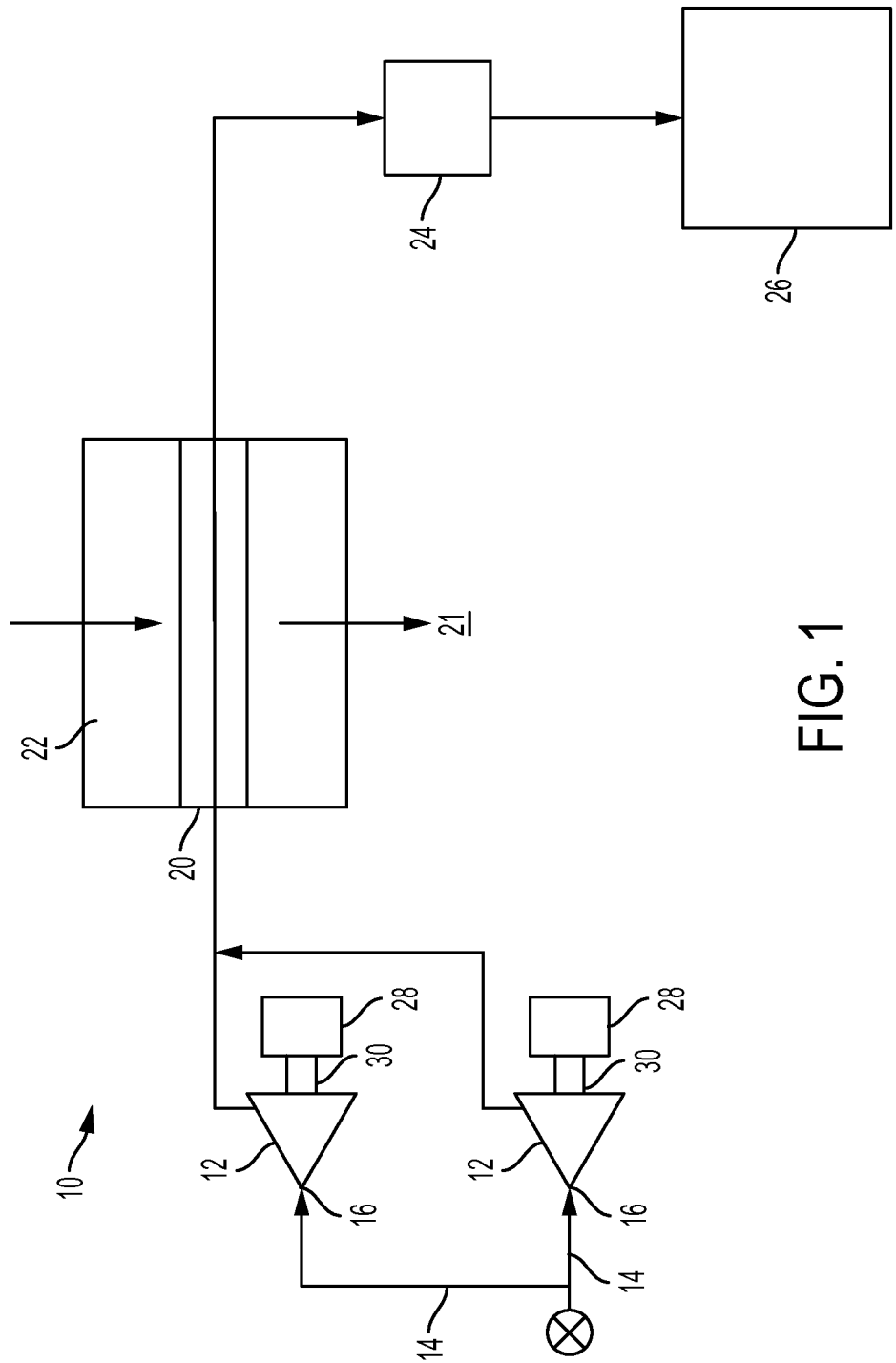
FIG. 1 is a partial schematic view of an environmental control system (ECS) of an aircraft.
Figure 2:
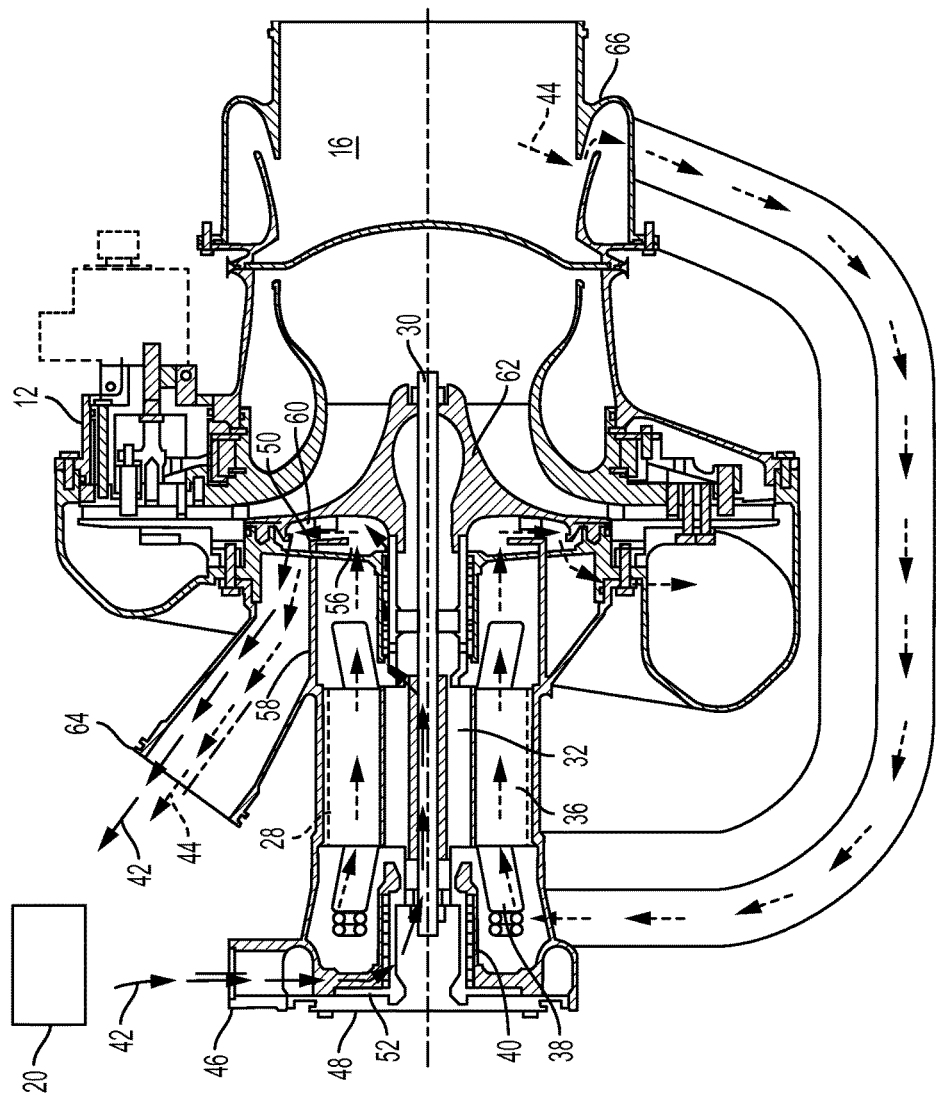
FIG. 2 is a cross-sectional view of a cabin air compressor (CAC) system of the ECS of FIG. 1.
Figure 3:
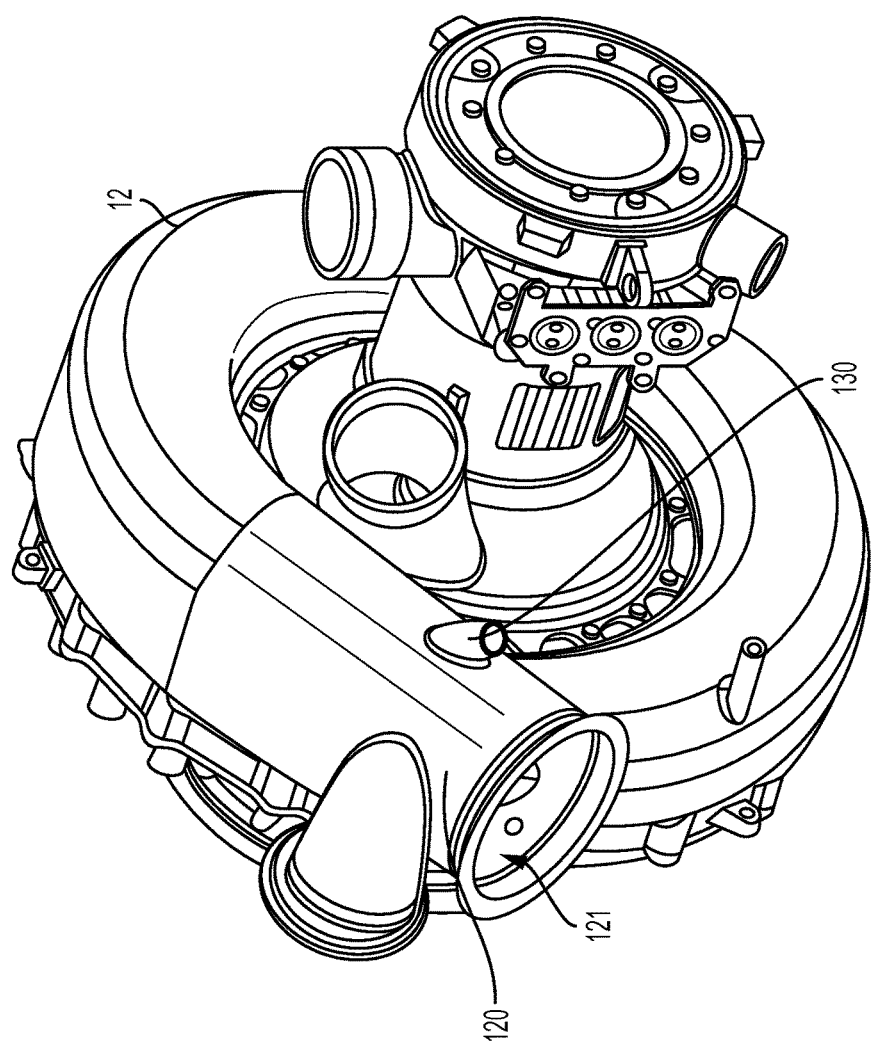
FIG. 3 is a perspective view of a CAC in accordance with embodiments.

With reference to FIGS. 1 and 2, an environmental control system (ECS) 10 for an aircraft includes one or more cabin air compressors (CACs) 12, which may be provided for example as centrifugal compressors. An outside airflow 14, or air from another source, flows into the CAC 12 at a compressor inlet 16. The CAC 12 compresses the airflow 14 and urges the airflow 14 from the compressor inlet 16 to a heat exchanger inlet 20, which may be provided as a part of a ram system 22, and an evaporator 24 and is then delivered to an aircraft cabin 26. Each CAC 12 is driven by a CAC motor 28 operably connected to the CAC 12 via a CAC shaft 30.

The CAC motor 28 is an electric motor having a rotor 32 rotatably located at the CAC shaft 30 and a stator 36 having a plurality of stator windings 38 disposed radially outboard of the rotor 32. The CAC motor 28 also includes one or more bearings 40 disposed at the CAC shaft 30. To prevent overheating of the CAC motor 28, particularly the stator windings 38 and the bearings 40, a cooling flow is drawn across the CAC motor 28. The cooling flow is driven generally by a pressure drop from the compressor inlet 16 to the ram system 22, for example, ram fan inlet 21. In some embodiments, as shown in FIG. 2, the cooling flow includes a bearing cooling flow 42 and a motor cooling flow 44. The bearing cooling flow 42 is supplied via bearing cooling inlet 46 at a first end 48 of the CAC motor 28 opposite a second end 50 at which the CAC 12 is disposed. The bearing cooling flow 42 proceeds across thrust bearings 52 located at the first end 48, and across shaft bearings 54 located, for example, at the CAC shaft 30 at the first end 48 and/or the second end 50 to remove thermal energy from the thrust bearings 52 and the shaft bearings 54. The bearing cooling flow 42 exits the CAC motor 28 at a cooling flow exit 56, which may be defined as an opening between the CAC motor 28 and the CAC 12 that provides a cooling flow outlet.

In some embodiments, the CAC motor 28 includes a shroud 58 which directs the bearing cooling flow 42 radially inwardly toward the CAC shaft 30 to the cooling flow exit 56. After passing through the cooling flow exit 56, the bearing cooling flow 42 proceeds substantially radially outwardly through an exit channel 60 defined, in some embodiments, between the shroud 58 and a CAC rotor 62. The bearing cooling flow 42 is then directed to a cooling flow outlet at motor exit 64 toward, for example, the ram fan inlet 21. The motor cooling flow 44 is drawn from the compressor inlet 16, and enters the CAC motor 28 at a motor inlet 66 at the first end 48 via a cooling conduit. The motor cooling flow 44 proceeds through the CAC motor 28, substantially from the first end 48 to the second end 50 removing thermal energy from the stator windings 38 and other components of the CAC motor 28. The motor cooling flow 44 then proceeds through the cooling flow exit 56, the exit channel 60 and the motor exit 64 toward, for example, the ram fan inlet 21.

In accordance with embodiments and, with reference to FIGS. 3-7, the CAC 12 may include a compressor outlet 120, a sensor port 130, a sensor 140 and a sensor supply tube assembly 150. The compressor outlet 120 is provided at an end of an annular compartment of the CAC 12 and includes a tubular body that is formed to define a main flowpath 121 for compressed fluids. The sensor port 130 is coupled to the compressor outlet 120 and includes a tubular port body that is formed to define a sensor port flowpath 131. The sensor port flowpath 131 is oriented transversely with respect to the main flowpath 121 and is disposed and configured to direct a portion of main flowpath fluid from the main flowpath 121, along the sensor port flowpath 131 and to the sensor 140. The sensor 140 may be provided as a fluid pressure sensor 141 and is operably disposed at an end of the sensor port 130. The sensor 140 may include a flange 142 that is securable to an outer edge of the sensor port 130, a main body 143 and a sensor inlet 144.

The sensor supply tube assembly 150 is non-rotatably disposable in the compressor outlet 120 and the sensor port 130 and is configured to direct the portion of the main flowpath fluid from the main flowpath 121 in the compressor outlet 120, along the sensor port flowpath 131 through a portion of the sensor port 130 and to the sensor inlet 144 of the sensor 140. More particularly, the sensor supply tube assembly 150 is configured to direct the portion of the main flowpath fluid along a first flowpath 145, along a second flowpath 146, which is oriented transversely with respect to the first flowpath 145, and along a curved flowpath 147. The curved flowpath 147 is interposed between the first and second flowpaths 145 and 146. With this configuration, the sensor supply tube assembly 150 provides resistance to the flow of debris from the main flowpath 121 to the sensor inlet 144 and thus reduces an amount of debris available to clog or otherwise foul the sensor 140.

Figure 4:
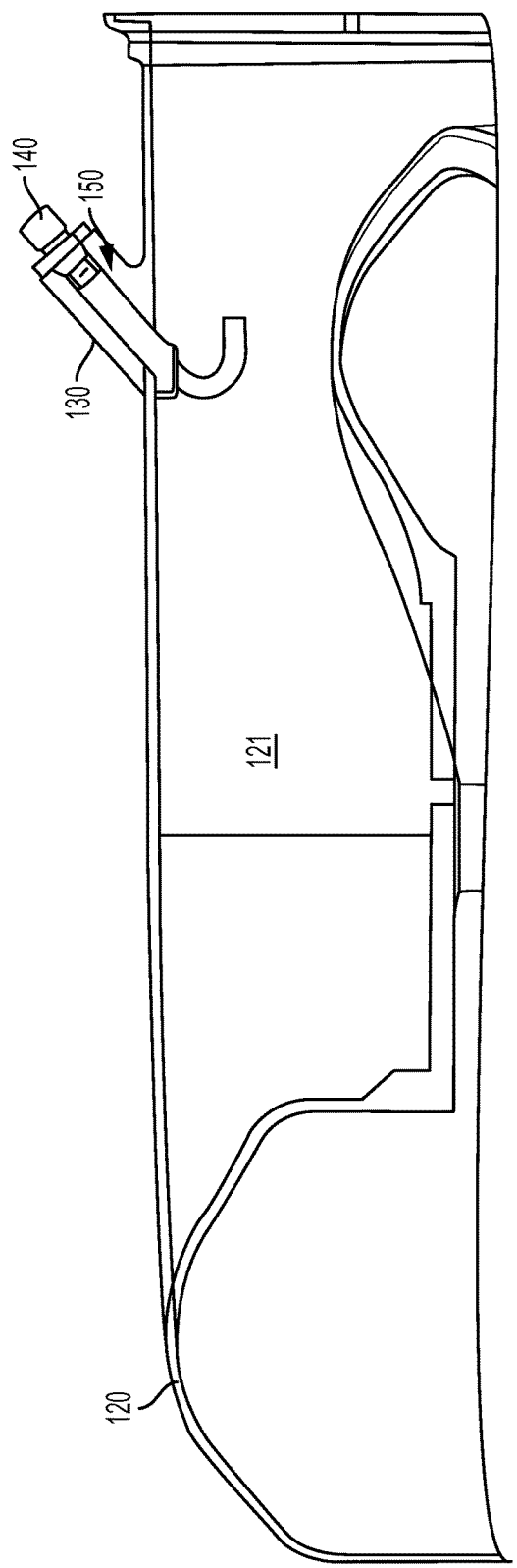
FIG. 4 is a side view of a compressor outlet of the CAC of FIG. 3.
Figure 5:
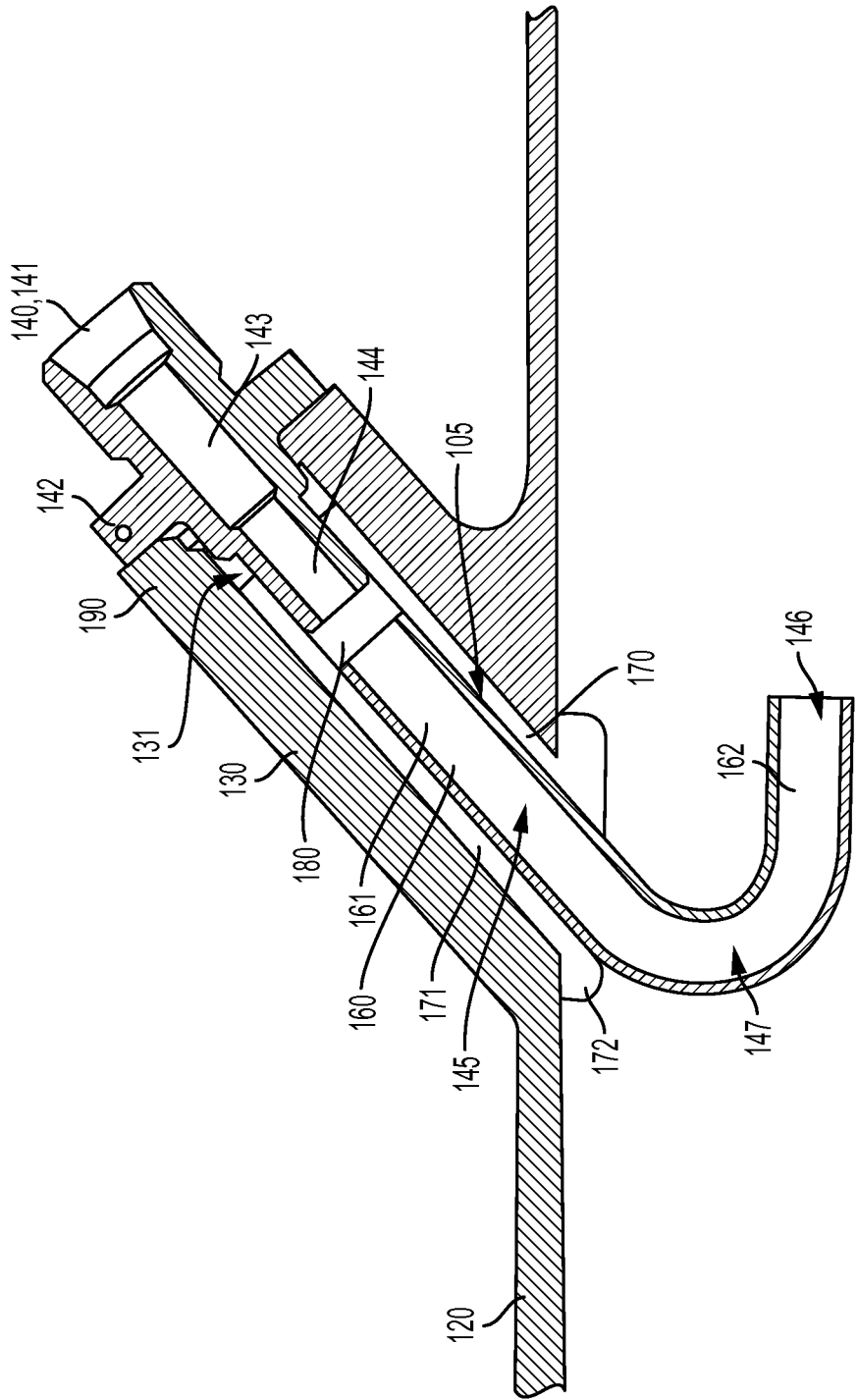
FIG. 5 is a side view of a sensor supply tube assembly in accordance with embodiments.

The sensor supply tube assembly 150 has an acute, J-shaped profile as shown in FIGS. 4 and 5 and includes a first tube 160 and a second tube 170. The first tube 160 is formed to direct the main flowpath fluid from the main flowpath 121 in the compressor outlet 120 to the sensor inlet 144 of the sensor 140 through a portion of the sensor port 130. The first tube 160 includes a first tube first end 161, which is disposed within the sensor port 130, a first tube second end 162, which is disposed within the compressor outlet 120 and is oriented acutely and transversely with respect to the first tube first end 161, and a curved tube section 163. The curved tube section 163 is interposed between the first tube first end 161 and the second tube second end 162. The first tube second end 162 extends in parallel with a predominant direction of flow of the main flowpath fluid along the main flowpath 121 toward an inlet of the curved tube section 163. The first tube first end 161 extends from an outlet of the curved tube section 163 in a direction having radially outward and aft components as shown in FIGS. 4 and 5. The radially outward and aft components are respectively defined relative to a longitudinal axis of the compressor outlet 120 and the predominant direction of flow of the main flowpath fluid along the main flowpath 121.

Figure 6:
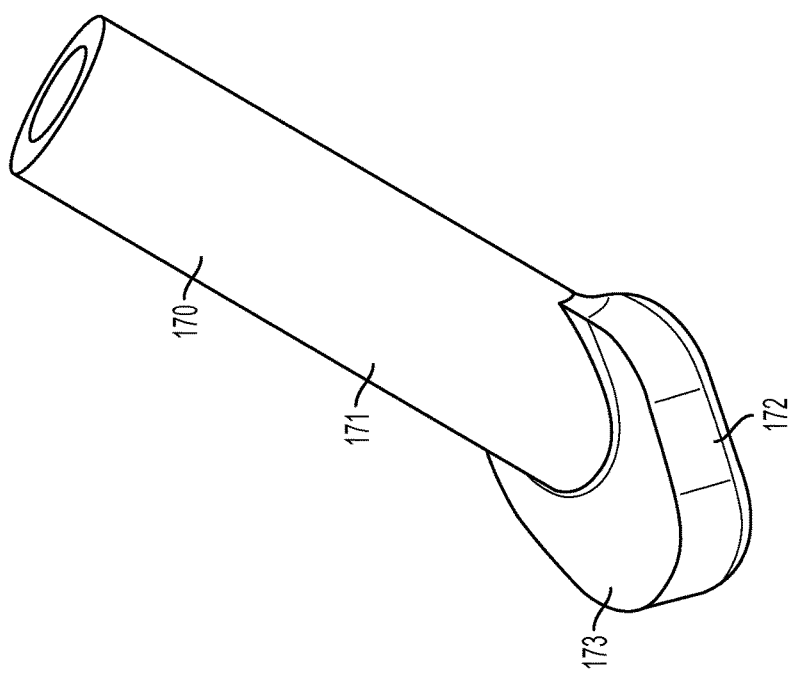
FIG. 6 is a perspective view of a component of the sensor supply tube assembly of FIG. 5.

As shown in FIG. 6, the second tube 170 includes a sleeve element 171 and a base element 172. The sleeve element 171 is tightly fittable between an exterior surface of the first tube first end 161 and an interior surface of the sensor port 130. The base element 172 has an exterior surface 173 from which the sleeve element 171 extends and which is disposed and configured to non-rotatably abut with an interior surface 1201 of the compressor outlet 120. The base element 172 further includes an interior surface that faces the main flowpath 121. In accordance with embodiments, the curved tube section 163 terminates (i.e., transitions to the first tube first end 161) at the interior surface of the base element 172.

In accordance with embodiments, the sleeve element 171 may be bonded to the exterior surface of the first tube first end 161. Such bonding may be achieved by way of welding, brazing or any other similar bonding process. Materials of the first tube 160 and the second tube 170 may be selected in accordance with at least a type of the bonding process.

With the configuration described above, the first tube 160 of the sensor supply tube assembly 150 may have a J-shaped profile with a short leg facing in a downstream direction of the main flowpath 121. As such, with respective sizes of the first tube 160 and the base element 172 of the second tube 170 limited, a wake generated by the sensor supply tube assembly 150 is relatively small as compared to an overall flow through the main flowpath 121 such that an aerodynamic impact of the sensor supply tube assembly 150 is limited.

In accordance with embodiments and, as shown in FIG. 5, the sensor supply tube assembly 150 may further include a sensor fitting 180. Such a sensor fitting 180 may be interposed between a distal portion of the first tube first end 161 and the sensor inlet 144 of the sensor 140 and may be configured to limit leakage of fluid between the first tube 170 and the sensor 140. In these or other embodiments, a distal portion of the sleeve element 171 may extend beyond the distal portion of the first tube first end 161 and, where applicable, the sensor fitting 180 to be engageable (e.g., threadably engageable) with an exterior surface of the sensor inlet 144.

Figure 7:
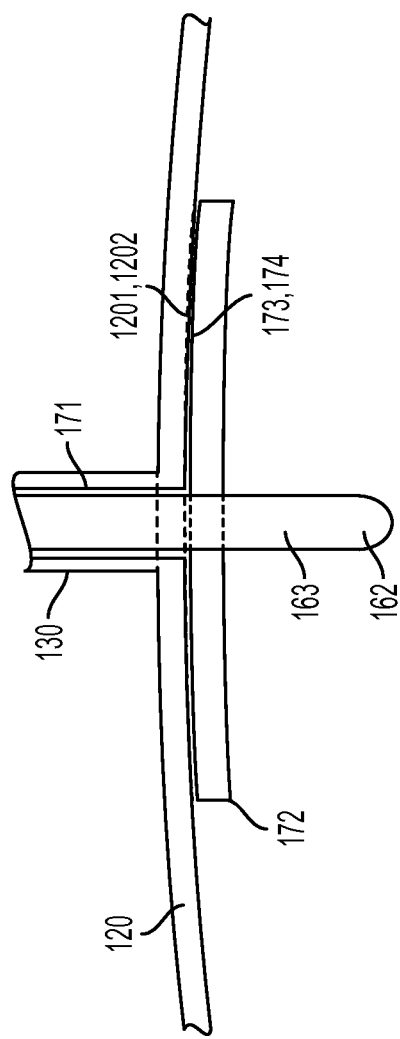
FIG. 7 is a schematic axial view of an anti-rotation feature of the component of FIG. 6 in accordance with embodiments.

In accordance with further embodiments and, with reference to FIG. 7, the exterior surface 173 of the base element 172 and the interior surface 1201 of the compressor outlet 120 may have respectively complementary curvatures 174 and 1202. As such, the base element 172 may be tightly fittable to the interior surface 1201 in an anti-rotational configuration that provides the sensor supply tube assembly 150 with an ability to resist rotation about a longitudinal axis of the first tube first end 161, for example. The respectively complementary curvatures 174 and 1202 may be symmetric relative to opposite sides of the first tube 160.

During an assembly of the sensor supply tube assembly 150, the sensor fitting 180 may be attached to the distal portion of the first tube first end 161 and the sleeve element 171 is slid over the sensor fitting 180 and the exterior surface of the first tube first end 161. Subsequently, the exterior surface of the first tube first end 161 is bonded to the sleeve element 171 and the first tube first end 161, the sensor fitting 180 and the sleeve element 171 are inserted into the sensor port 130. At this point, the sensor 140 is installed by rotating the sensor 140 and thereby threadably engaging the sensor inlet 144 with the distal portion of the sleeve element 171. Such installation draws exterior surface 173 of the base element 172 toward the interior surface 1201 of the compressor outlet in a tightening manner and may include the additional installation of seals 190 between the sensor 140 and the sensor port 130.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A sensor supply tube assembly disposed within a compressor outlet through which a main flowpath is defined and a sensor port,
   the compressor outlet being configured such that a predominant direction of flow through the main flow path is substantially straight immediately upstream of and immediately downstream from the sensor port, and
   the sensor port is integrally and transversely coupled to the compressor outlet to form an acute angle,
   the sensor supply tube assembly comprising:
   a first tube formed to direct main flowpath fluid from the compressor outlet and through a portion of the sensor port and comprising first and second ends disposed within the sensor port and the compressor outlet, respectively, and a curved section interposed between the first and second ends; and
   a second tube comprising a sleeve tightly fittable between the first end and the sensor port and a base having an exterior surface from which the sleeve extends at a same angle as the acute angle formed between the sensor port and the compressor outlet, the exterior surface being disposed and configured to non-rotatably abut with an interior surface of the compressor outlet,
   wherein the first tube has an acute J-shaped profile which corresponds to the acute angle such that:
   the second end extends in parallel with the predominant direction of flow of the main flowpath fluid along the main flowpath toward an inlet of the curved section, and
   the first end extends from an outlet of the curved section in a direction having radially outward and aft components respectively defined relative to a longitudinal axis of the compressor outlet and the predominant direction of flow of the main flowpath fluid.

2. The sensor supply tube assembly according to claim 1, further comprising a sensor fitting disposed at a distal portion of the first end.

3. The sensor supply tube assembly according to claim 1, wherein a distal portion of the sleeve extends beyond the first end.

4. The sensor supply tube assembly according to claim 1, wherein an exterior surface of the first end is bonded to an interior surface of the sleeve.

5. The sensor supply tube assembly according to claim 1, wherein the curved section terminates at the base.

6. The sensor supply tube assembly according to claim 1, wherein the exterior surface of the base and the interior surface of the compressor outlet have respectively complementary curvatures which are symmetric relative to opposite sides of the first tube.

7. A cabin air compressor (CAC), comprising:
   a compressor outlet through which a main flowpath is defined;
   a sensor port integrally and transversely coupled to the compressor outlet to form an acute angle with the compressor outlet,
   wherein the compressor outlet is configured such that a predominant direction of flow through the main flow path is substantially straight immediately upstream of and immediately downstream from the sensor port;
   a sensor coupled to the sensor port;
   a first tube formed to direct main flowpath fluid from the compressor outlet and through a portion of the sensor port to the sensor and comprising first and second ends disposed within the sensor port and the compressor outlet, respectively, and a curved section interposed between the first and second ends; and
   a second tube comprising a sleeve tightly fittable between the first end and the sensor port and a base having an exterior surface from which the sleeve extends at a same angle as the acute angle formed between the sensor port and the compressor outlet, the exterior surface being disposed and configured to non-rotatably abut with an interior surface of the compressor outlet,
   wherein the first tube has an acute J-shaped profile which corresponds to the acute angle such that:
   the second end extends in parallel with the predominant direction of flow of the main flowpath fluid along the main flowpath toward an inlet of the curved section, and
   the first end extends from an outlet of the curved section in a direction having radially outward and aft components respectively defined relative to a longitudinal axis of the compressor outlet and the predominant direction of flow of the main flowpath fluid.

8. The CAC according to claim 7, wherein the sensor comprises a pressure sensor.

9. The CAC according to claim 7, further comprising a sensor fitting interposed between a distal portion of the first end and an inlet of the sensor, wherein a distal portion of the sleeve extends beyond the first end to be threadably engageable with the inlet of the sensor.

10. The CAC according to claim 7, wherein an exterior surface of the first end is bonded to an interior surface of the sleeve.

11. The CAC according to claim 7, wherein the curved section terminates at the base.

12. The CAC according to claim 7, wherein the exterior surface of the base and the interior surface of the compressor outlet have respectively complementary curvatures which are symmetric relative to opposite sides of the first tube.

13. A cabin air compressor (CAC), comprising:
a compressor outlet through which a main flowpath is defined;
a sensor port integrally and transversely coupled to the compressor outlet to form an acute angle with the compressor outlet,
wherein the compressor outlet is configured such that a predominant direction of flow through the main flow path is substantially straight immediately upstream of and immediately downstream from the sensor port;
a pressure sensor coupled to the sensor port; and
a sensor supply tube assembly non-rotatably disposable in the compressor outlet and the sensor port to direct main flowpath fluid from the compressor outlet and through a portion of the sensor port to the pressure sensor along first and second acutely transverse flowpaths that form an angle that is a same angle as the acute angle and along a curved flowpath interposed between the first and second flowpaths,
the first flowpath extending in parallel with the predominant direction of flow of the main flowpath fluid flow along the main flowpath toward an inlet of the curved flowpath, and
the second flowpath extending from an outlet of the curved flowpath in a direction having radially outward and aft components respectively defined relative to a longitudinal axis of the compressor outlet and the predominant direction of flow of the main flowpath fluid.

14. The CAC according to claim 13, further comprising a sensor fitting interposed between the sensor supply tube assembly and the pressure sensor.

15. The CAC according to claim 13, wherein the first, second and curved flowpaths cooperatively form a J-shape.

16. The CAC according to claim 13, wherein the sensor supply tube assembly comprises:
a first tube formed to define the first, second and curved flowpaths; and
a second tube comprising:
a sleeve tightly fittable between a first end portion of the first tube and the sensor port; and
a base having an exterior surface from which the sleeve extends and which is disposed and configured to non-rotatably abut with an interior surface of the compressor outlet,
the exterior surface of the first end portion of the first tube being bonded to an interior surface of the sleeve.

17. The CAC according to claim 16, wherein the curved flowpath terminates at the base.

18. The CAC according to claim 16, wherein the exterior surface of the base and the interior surface of the compressor outlet have respectively complementary curvatures which are symmetric relative to opposite sides of the first tube.

* * * * *